US007570347B2

(12) United States Patent
Ruff et al.

(10) Patent No.: US 7,570,347 B2
(45) Date of Patent: Aug. 4, 2009

(54) CHIRPED AMPLITUDE MODULATION LADAR

(75) Inventors: William Charles Ruff, Catonsville, MD (US); Barry L. Stann, Edgewater, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/768,635

(22) Filed: Jun. 26, 2007

(65) Prior Publication Data

US 2009/0002680 A1 Jan. 1, 2009

(51) Int. Cl.
*G01C 3/08* (2006.01)
(52) U.S. Cl. .................................................. 356/5.01
(58) Field of Classification Search ....... 356/3.01–3.15, 356/4.01–4.1, 5.01–5.15, 6–22, 28, 28.5, 356/139.01–139.1
See application file for complete search history.

(56) References Cited

U.S. PATENT DOCUMENTS 4,839,569 A * 6/1989 Dallin, II .................... 315/383

| 5,608,514 | A | 3/1997 | Stann et al. |
| 5,877,851 | A * | 3/1999 | Stann et al. ................ 356/5.09 |
| 6,618,125 | B2 | 9/2003 | Stann |
| 2003/0076485 | A1 | 4/2003 | Ruff et al. |
| 2005/0095010 | A1* | 5/2005 | Ionov ......................... 398/189 |
| 2006/0197937 | A1* | 9/2006 | Bamji et al. ............... 356/5.01 |

OTHER PUBLICATIONS

B.L. Stann, W.C. Ruff, nd Z.G. Sztankay; "Intensity-Modulated Diode Laser Radar Using Frequency-Modulation/Continuous-Wave Ranging Techniques;" Optical Engineering; Nov. 1996, vol. 35, No. 11; pp. 3270-3278.
W.Ruff, S. Kennerly, K. Ritter, P. Shen, B. Stann, M. Stead, and G. Sztankay; "Self-Mixing Detector Candidates for an FM/cw Ladar Architecture;" US Army Research Lab.

* cited by examiner

*Primary Examiner*—Thomas H Tarcza
*Assistant Examiner*—Luke D Ratcliffe
(74) *Attorney, Agent, or Firm*—A. David Spevack

(57) ABSTRACT

An imaging method and apparatus using an unmodulated pulsed laser with a chirp modulated receiver is provided for producing 3D plus intensity imagery of targets in heavily cluttered locations The apparatus includes a laser for emitting a laser beam and synchronizing a receiver to receive a reflected laser signal and transform the reflected laser signal into a displayable image that includes intensity information.

5 Claims, 8 Drawing Sheets

CHIRPED AMPLITUDE MODULATION LADAR

GOVERNMENT INTEREST

The invention described herein may be manufactured, used, and licensed by or for the United States Government.

BACKGROUND

Laser detection and ranging (ladar) may be used in a military context for elastic backscatter light detection and ranging (lidar) systems. The acronym LADAR is usually associated with the detection of hard targets, while the acronym LIDAR is usually associated with the detection of aerosol targets. However, there has been no real standard on their use and both acronyms may be used interchangeably to describe the same laser ranging system. A ladar system is similar to a radar system with the exception that a much shorter wavelength of the electromagnetic spectrum is used, typically in the ultraviolet, visible, or near infrared spectrums. With a radar system, it is possible to image a feature or object of about the same size of the wavelength or larger. Due to diffraction limits, the laser radiation is easier to collimate than microwave radiation given realistic aperture constraints. This gives a compact ladar the ability to image a target with at a high spatial resolution.

In order for a ladar system target to reflect a transmitted electromagnetic wave, an object needs to produce a dielectric discontinuity from its surroundings. At radar frequencies, a metallic object produces a dielectric discontinuity and a significant specular reflection. However, non-metallic objects, such as rain and rocks produce weaker reflections, and some materials may produce no detectable reflection at all, meaning some objects or features are effectively invisible at radar frequencies. In a military context, metallic objects may be disguised by use of a non-metallic covering material.

Lasers provide one solution to this problem regarding non-metallic detection. The beam densities and coherency of lasers are excellent. Moreover, the wavelengths are much smaller than can be achieved with radio systems, and range from about 10 µm to around 250 nm. At such wavelengths, the waves are reflected very well from small objects such as molecules and atoms. This type of reflection is called diffuse "backscattering." Both diffuse and specular reflection may be used for different ladar applications.

The Army Research Laboratory has demonstrated the capability of its previously patented chirped amplitude modulation (AM) ladar technique to produce high-resolution, range-resolved intensity imagery (3D+intensity) of targets in heavy clutter, under dense foliage canopy, and obscured by camouflage nets. This technique is covered in U.S. Pat. No. 5,877,851 for "Scannerless Ladar Architecture Employing Focal Plane Detector Arrays and FM-CW Ranging Theory" and in U.S. Pat. No. 5,608,514 for "High-Range Resolution Ladar," which are hereby incorporated by reference. These previously patented techniques use a modulated continuous wave (CW) laser as an illumination source and a photon detection receiver. For some applications, a high-peak power illumination source is required to satisfy the design requirements, which is not easily achieved with a CW source. For those applications, it is advantageous to use a short-pulse laser as an illumination source due to their high-peak powers and commercial availability. However, since the duration of the laser pulse is extremely short, it is not feasible to chirp modulate the laser intensity as is required with the current ladar architecture Therefore, a modification to the existing ranging technique is required.

SUMMARY

Embodiments of the present disclosure provide apparatuses and methods for using Chirped Amplitude Modulation Ladar. Briefly described, one embodiment of the apparatus, among others, comprises: a laser source configured to emit an unmodulated pulsed laser beam, a reflection of which produces an optical signal; a receiver configured to receive the optical signal; a modulator configured to modulate a gain of the receiver to produce a modulated optical signal; an integrator configured to determine a state of the modulated optical signal; and a detection circuit adapted to measure the amplitude of the state of the modulated optical signal.

One embodiment of such a method, among others, can be broadly summarized by the following steps: triggering a laser to emit an unmodulated laser beam; modulating the gain of a receiver; receiving, at the modulating receiver, a reflected laser beam signal associated with the laser beam emission; and determining at least one characteristic associated with the reflected laser beam signal.

Other systems, methods, features, and/or advantages of the present disclosure will be or may become apparent to one with skill in the art upon examination of the following drawings and detailed description. It is intended that all such additional systems, methods, features, and/or advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 5:
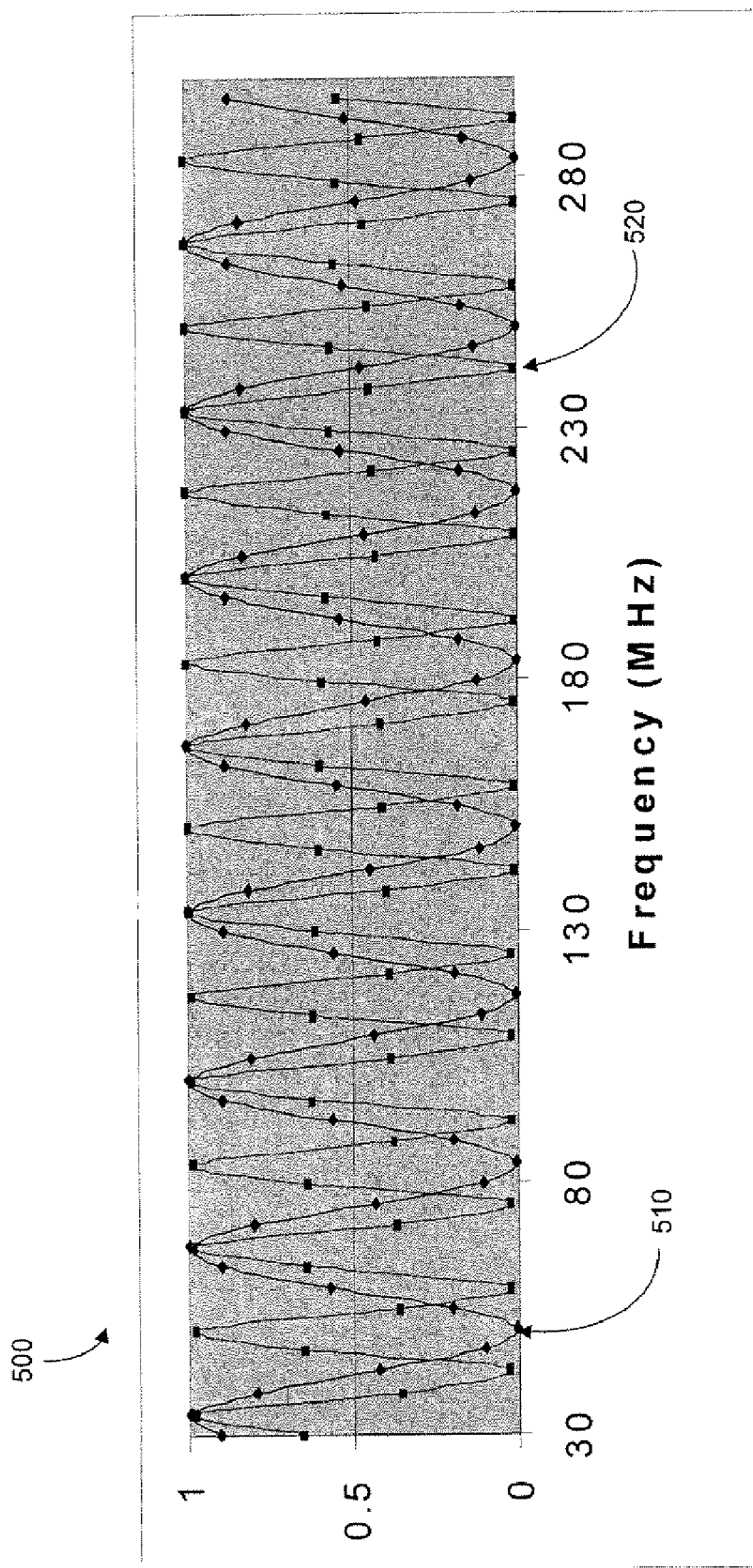
FIG. 5 is a graph of detected target signals for two individual targets at positions of 0.25 and 0.5 respectively.

FIG, 6 is a graph of a discrete Fourier transform of the reflected signal of the two targets of FIG. 5.

Figure 7:
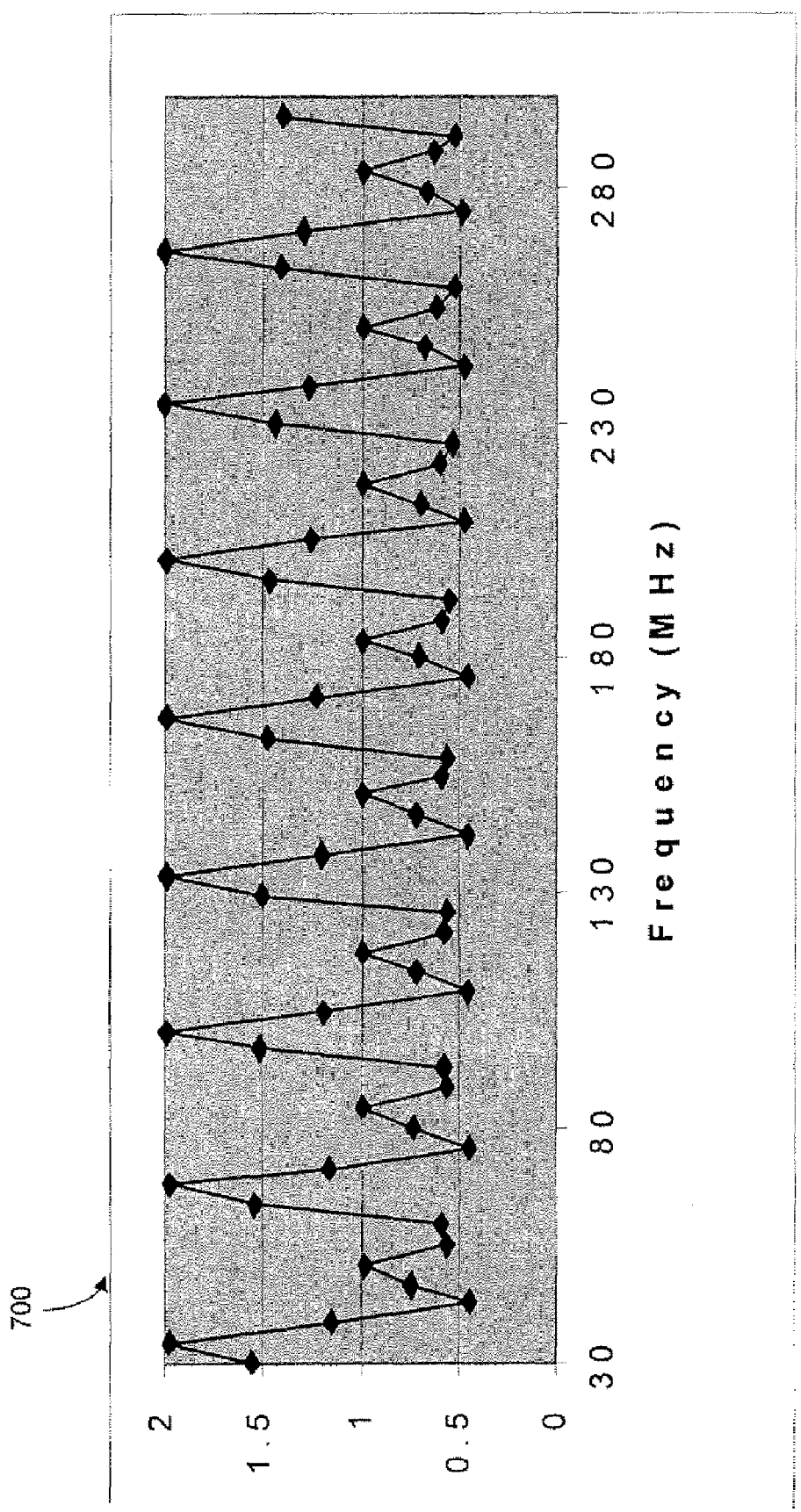

FIG. 7 is a graph of the superposition of the oscillations of the two frequencies corresponding to the range of each individual target of FIG. 5.

Figure 8:
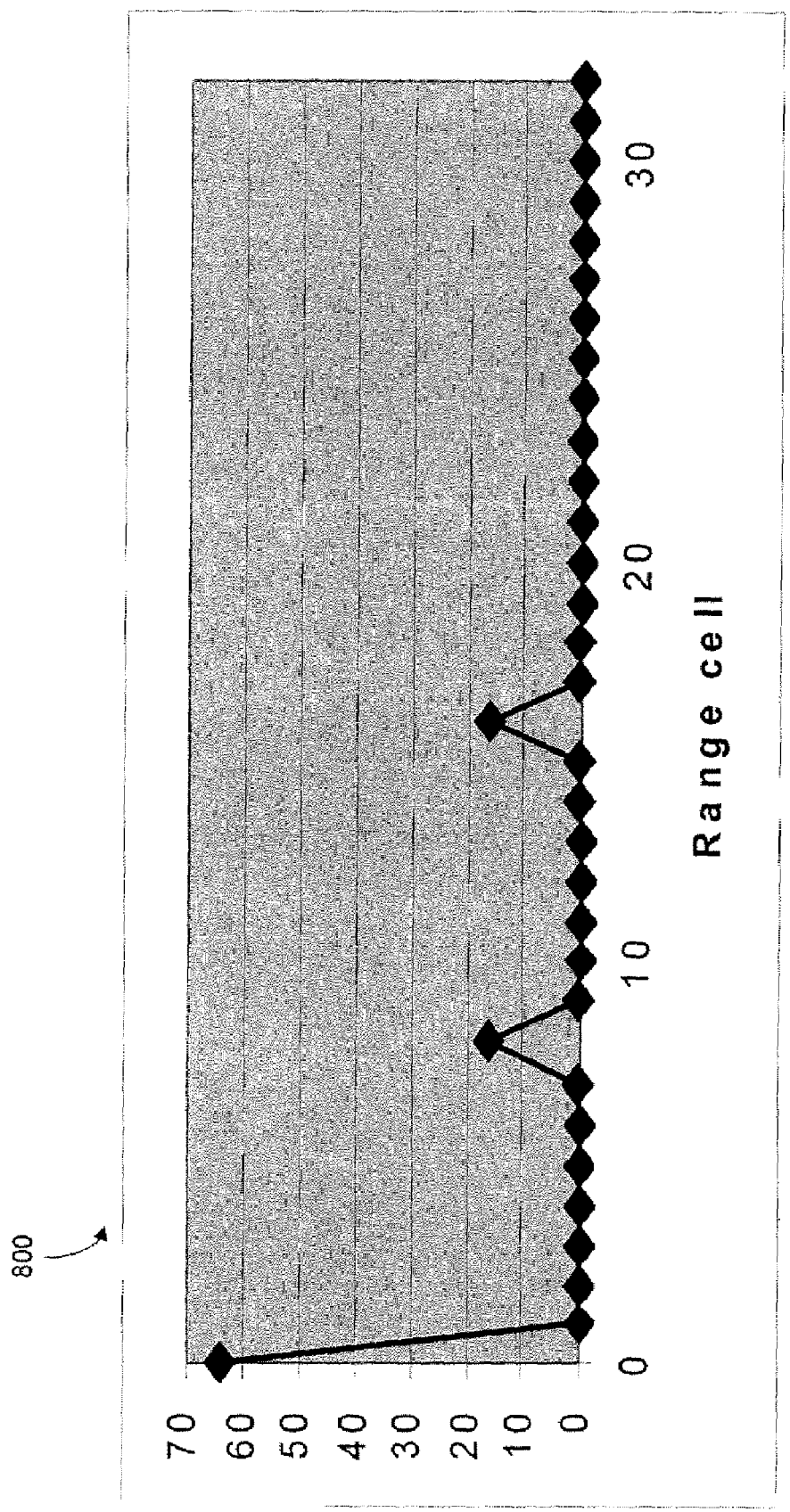

FIG. 8 is a graph of the magnitude of the discrete Fourier transform for the 2-target signal of FIG. 7.

DETAILED DESCRIPTION

Embodiments of an apparatus for chirped amplitude modulation ladar disclosed herein use a short-pulse laser as an illumination source. The illumination source is used to interrogate the state of the local oscillator waveform applied to any modulatable optical receiver compatible with the laser source and modulation waveform. The illumination source is not amplitude modulated with the modulation waveform, which can simplify its implementation and allow the use of commercial-off-the-shelf (COTS) lasers. The laser pulse width is preferably less than one-half the pulse width of the maximum modulation frequency, and may be as large as several tens of nanoseconds. This pulse width is compatible with commercially available high-peak power pulsed lasers.

Several sensors are being developed in the area of long-range detection in the classification of targets, such as the Laser Illuminated Viewing and Ranging (LIVAR®) imaging sensor and the Cost Effective Targeting System (CETS) that operate in the 1.55 micrometer wavelength operation. Both sensors function by triggering the laser to transmit a short pulse of light to illuminate the area of interest. Simultaneously, an image intensifier is turned on, or gated, for a short period of time after a predetermined amount of delay from the laser pulse trigger. The gating forms an image on the intensifier tube due to the scattered light from the laser and in a range swath proportional to the gate time, roughly 36 meters for a 120 ns gate, at a distance from the sensor set by the delay time. These sensors are useful for detecting and classifying targets in the open since they provide high resolution imagery with reasonable signal-to-noise ratio using the intensifier tube as a receiver and the laser as a controllable illumination source. The sensor has difficulty, however, in cluttered terrain since it cannot separate targets from clutter objects when they are within the same range swath.

One approach to solving this deficiency is to continue to reduce the gate-width to a few nanoseconds, thus decreasing the probability that a clutter object and the target are in the same range of the swath. Using this approach would require the sensor to acquire multiple gated images in order to build an effective overall image over a reasonable target size, making the gate timing delay difficult to implement. Also, generating such a narrow tube gate is very difficult to implement in a practical system.

Another approach is to modify the system so that the actual time of flight of the laser pulse is measured directly on the focal plane. This is the typical detection technique used with single or few detector ranging sensors, such as a range finder or scanned imaging ladar. However, is very difficult to implement in a large array of detectors. There is significant research to extend the state-of-the-art for such time of flight focal plane array sensors. However, there are still significant problems such as pixel cross-talk, clock noise, yield, and manufacturability which need to be addressed.

Another previous approach is to directly apply the ARL patented chirp AM ladar technique to the current sensor. To implement this approach, the modulation waveform, such as a continuous chirp signal, would be directly applied to the gain of the image intensifier tube and the intensity of a CW laser source. The two signals would then be multiplied, or mixed, in the detection process to produce an output signal whose frequency is proportional to the range of the target. Application of this technique has a number of advantages such as the ability to form multiple range cells inside of the current range swath and to image multiple targets in a given pixel. Unfortunately, to fully implement this technique requires a modulated high-peak-power laser illumination source, which may be difficult to design.

Figure 1:
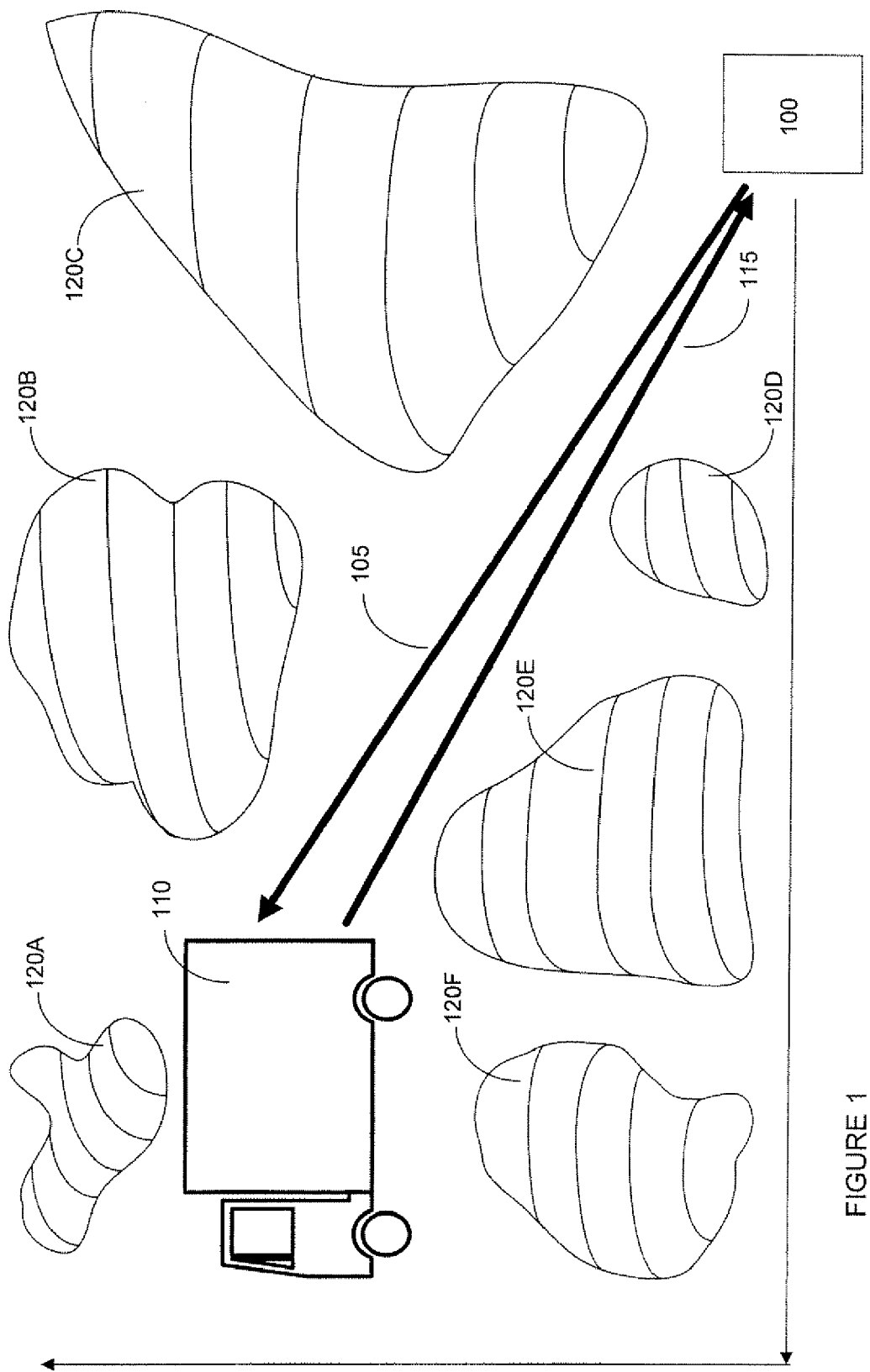
FIG. 1 is a top view of an environment in which an exemplary embodiment may be utilized.
Figure 2:
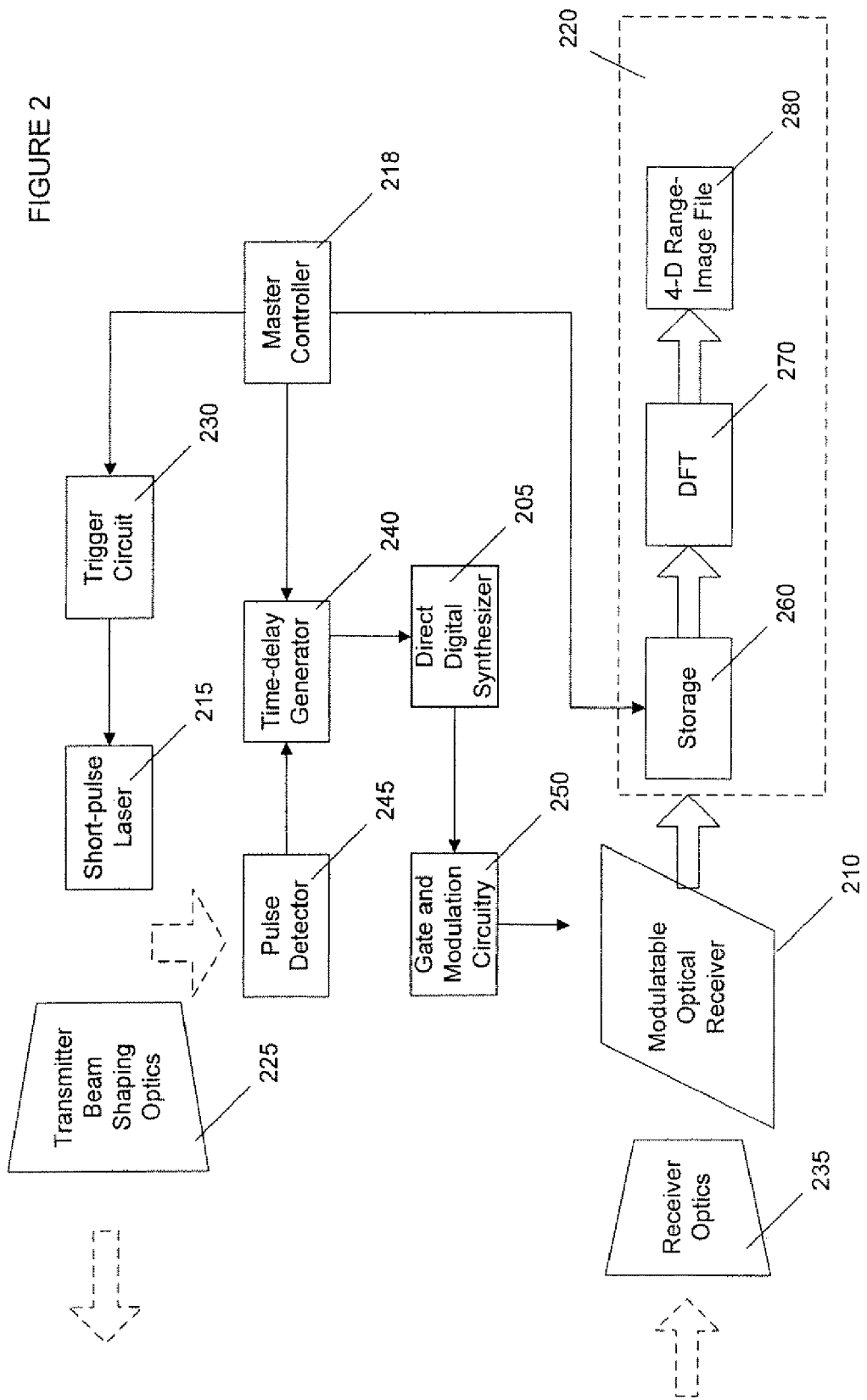
FIG. 2 is a block diagram of an exemplary embodiment of a chirped amplitude modulation ladar using a short-pulse laser transmitter which may be utilized in the environment provided in FIG. 1.

FIG. 1 depicts an environment in which an exemplary embodiment of chirped amplitude modulation ladar system 100 may be utilized. The environment includes target 110 surrounded by various non-target subjects 120A-F, which may mask target 110 from conventional radar detection systems. Ladar system 100 emits laser pulse 105. After laser pulse 105 reaches target 110, reflection 115 is received at ladar system 100 where reflection 115 is processed. Target 110 can be discerned from non-target objects 120A-F through processing performed in ladar system 100, FIG. 2 is a simplified block diagram of one exemplary embodiment of chirped amplitude modulation ladar (ladar system) 100 using a short-pulse laser transmitter. In this exemplary embodiment, direct digital synthesizer (DDS) 205 is operated in a stepped-frequency modulation mode for the chirp modulation source in order to modulate the gain of the receiver. However, any other ranging waveforms may be implemented as discussed in the references above, such as, but not limited to, continuous and stepped versions of saw-toothed frequency chirp, up-down frequency chirp, or a pseudo-random code. DDS 205 is also used to initiate gate and modulation circuitry 250, which gates optical receiver 210 on and off to form the range swath. Any device capable of the gating function could also be used in conjunction with DDS 205.

Modulatable optical receiver 210 shown in FIG. 2 may be an electron-bombarded image intensifier tube with a voltage controllable optical gain for converting the signal received through receiver optics 235 into an electrical signal. However, any modulatable optical receiver compatible with laser source 215 and modulation waveform produced by gate and modulation circuitry 250, such as, but not limited to, self-mixing detectors, electro-optic modulator followed by detector focal plane array, an avalanche photo-detector array, or a photon-counting detector array. In this embodiment, the optical receiver is communicatively coupled to an integrating read-out structure 220 to integrate the signal over the gate width. However, any detection circuit capable of measuring the signal amplitude can also accomplish the signal detection. Read-out structure 220 may be comprised of storage 260 and discrete Fourier transform module 270 to produce 4-D range-image file 280 for display.

Master controller 218 controls trigger circuit 230 which triggers short-pulse laser 215 in an exemplary embodiment. The laser is emitted through transmitter beam shaping optics 225 towards potential objects for which some measurement (e.g., distance) is desired. Pulse dectector 245 detects the laser pulse emission, and together with the master controller, signal a time-delay to be generated by time-delay generator 240. The time delay generated by time-delay generator 240 is used by DDS 205 to adjust the output of gate and modulation circuitry 250.

Figure 3:
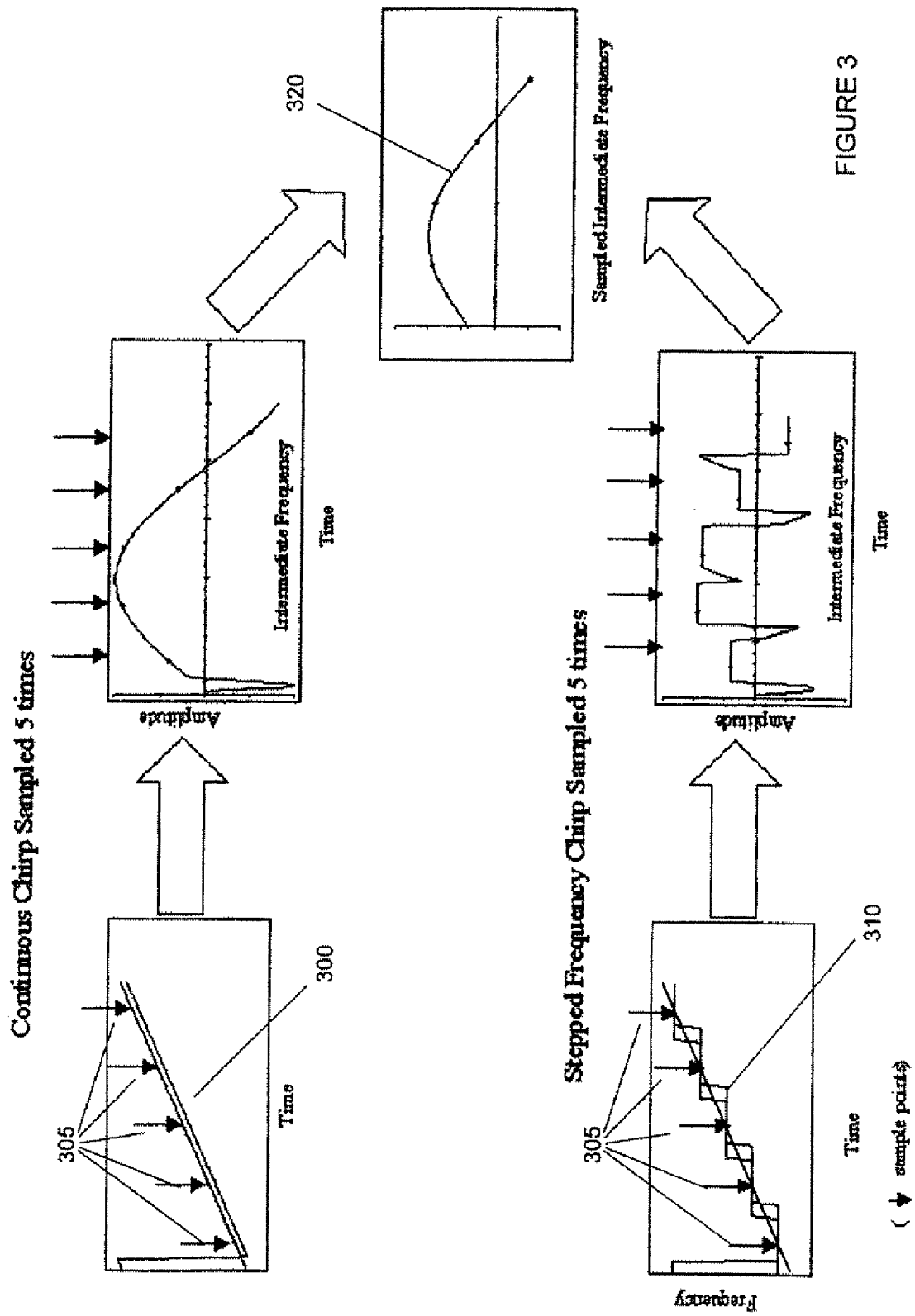
FIG. 3 is a comparison graph of a sampled continuous chirp waveform and a step-chirp waveform for a small number of sample times as used in an exemplary embodiment according to FIG. 2.

FIG. 3 is an illustrative comparison of a sampled continuous chirp waveform 300 and a step-chirp waveform 310 for a small number of sample times. By sampling the continuous chirp waveform 300 at discrete times 305, the continuous chirp 300 can be replaced by a step-chirped waveform 310 whose stepped frequencies are equal to the instantaneous frequency of the continuous chirp at sample times 305. When this is performed, the signal processing 320 of the sample of intermediate frequency signal derived from either chirped waveform is identical. Embodiments of a chirped amplitude modulation ladar may use either chirp waveform; however, for illustrative purposes, it is simpler to explain its operation mathematically using the stepped frequency chirped waveform.

Figure 4:
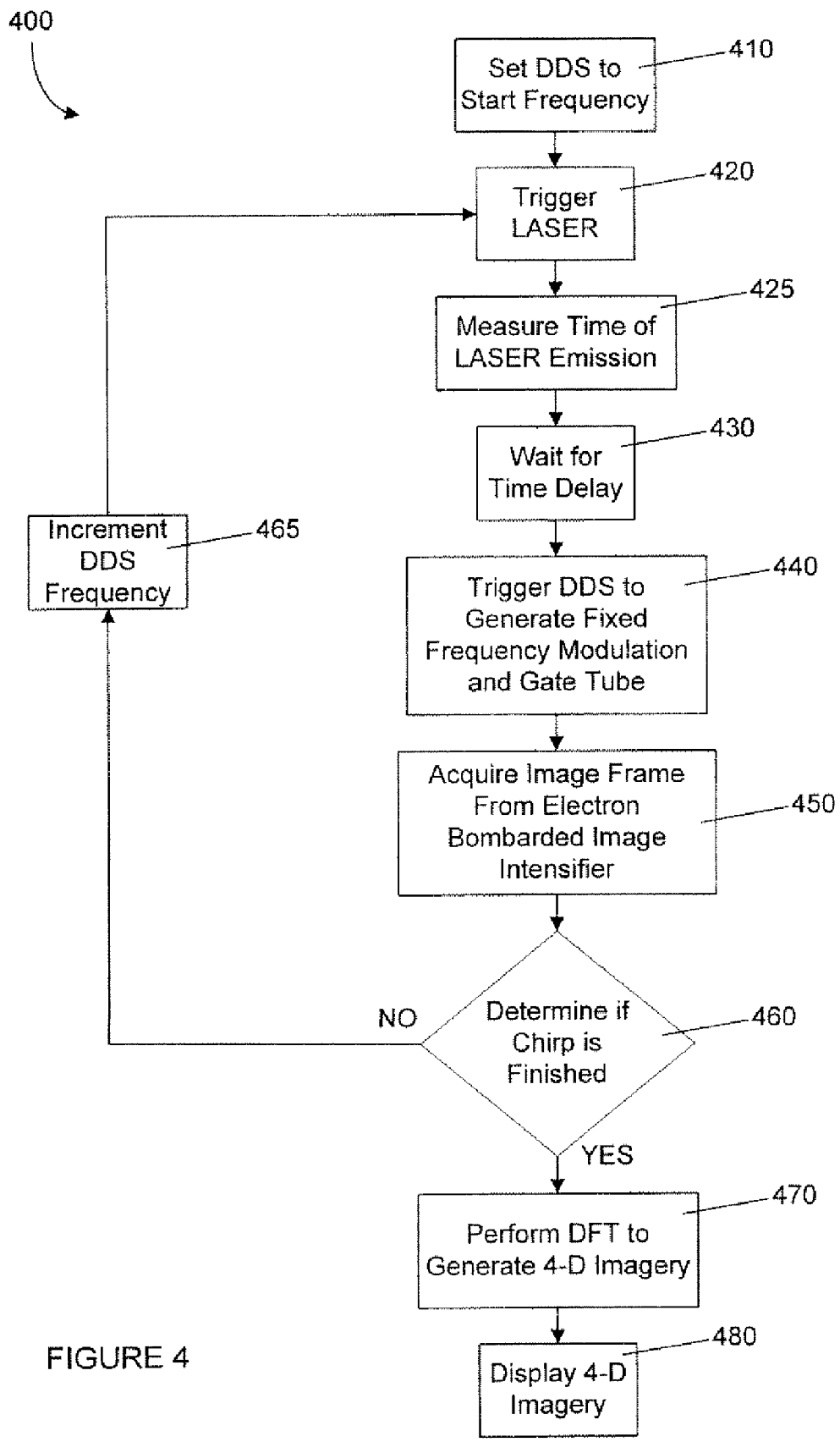
FIG. 4 is a flow diagram of a method of using a short-pulse laser transmitter for chirped amplitude modulation ladar as used in an exemplary embodiment according to FIG. 2.

FIG. 4 provides a flow diagram 400 for an exemplary embodiment as illustrated in FIG. 2. To begin the acquisition of a ladar, first, calculations are made for the time delay, gate time, chirp frequency deviation, number of frequency steps, and frequency step size. The time delay is calculated using the range to the target, r, and the speed of light, c, by $$t_d = \frac{2R}{c}.$$

The gate time is determined similarly using the required range swath, Rs, by $$t_g = \frac{2R_s}{c}.$$

The chirped frequency deviation, $\Delta F$, is determined by the range resolution, $\Delta R$, using $$\Delta F = \frac{c}{2\Delta R}.$$

The number of frequency steps, $N_{steps}$, required for an unaliased range measurement is $2Rs/\Delta R$ and the frequency step size, $F_{steps}$ is $\Delta F/N_{steps}$.

Once these parameters are determined, in block 410, the DDS may be programmed with a sinusoidal frequency $F_{start}$ and the laser pulse is initiated in block 420. The laser pulse exits the laser cavity and, in block 425, a sample of the pulse is measured by the pulse detector and converted to an electrical signal. In block 430, this electrical signal, which is a measure of the exact time of the laser emission, is delayed by $t_d$ and used to trigger the DDS and gating circuit. In block 440, the DDS gates or turns-on the electronic-bombarded image intensifier tube for $t_d$ and concurrently modulates the gain of the image intensifier with the sinusoidal signal at frequency $F_{start}$.

Substantially simultaneously, the laser pulse travels out to the target at range R, is scattered by the target, and a portion of the scattered signal is collected by the receiver optics and imaged onto the photocathode of the image intensifier tube in block 450. The short-pulse of a laser light is detected by the photocathode and converted to an electrical signal that is amplified in the image intensifier tube by the instantaneous value of its modulated gain Each detecting element in the focal plane array then integrates the electrical signal over the gate time $t_g$, amplifies the signal, and converts the signal to a digital number that is then stored in the memory device. After the digital data is stored, the master controller sets the DDS output frequency to $F_{start}+F_{step}$ in block 465 and repeats the process. This is continued until, in block 460, the number of steps, $N_{steps}$, necessary to complete the chirp waveform is determined to have been reached. In block 470, the stored data is processed using discrete Fourier transforms to generate the 3-D plus intensity data set (4-D image), and displayed in an appropriate format in block 480. Since the same modulation waveform is applied to every pixel of the receiver, the ranges and intensities of each scatterer within the gate limited range swath viewed by each pixel are measured, so that a 3-D plus intensity image of the scene can be formed using this technique.

As an illustrative case of the embodiment of FIG. 2, a target may be imaged at a range of 5 km over a range swath of 18 m with a range resolution of 0.564 m. Using these parameters, $t_d$ is calculated at 33.3 µs, $t_g$ is 120.0 ns, $\Delta F$ is 266 MHz, $N_{step}$ is 64, and $F_{step}$ is 4.16 MHz. For this example, a starting modulation frequency of 30 MHz is chosen. From the flow diagram of FIG. 4, to begin an image collection, the master controller sets the DDS output frequency to 30 MHz and initiates a laser pulse. This laser pulse is detected, converted to an electrical signal, delayed by the time delay generator by 33.3 µs, and used to trigger the DDS. The DDS gates the tube for 120 ns and simultaneously modulates the gain of the electron bombarded image intensifier tube at a 30 MHz frequency.

The target signal is detected by the photocathode, converted to an electrical signal, integrated in each signal in the read-out structure, amplified, converted to a digital number, and stored in memory. After the digital data is stored, the master controller sets the DDS output frequency to 34.16 MHz and repeats the process. This is continued until all 64-frequency steps necessary to complete the chirp waveform are finished. The stored data for each pixel over all frequency steps is then processed using discrete Fourier transforms to generate the 3-D plus intensity data set, and displayed on a stereo-graphics enabled computer screen.

Mathematically, the signals necessary to explain the ladar operation can be expressed using the following simplified equations:

Transmitter function: $\delta T$; simplified short pulse initiated at time 0

Receiver gain function: $\frac{1}{2}(1+\cos(\omega_{step}t))*Gate(t)$; where Gate=1 or 0

Target function at receiver $\delta(t-\tau)$, where $\tau$ is the round trip delay time for the transmitter to the target and back to the receiver.

The target signal detected by the image intensifier tube is found by multiplying the target function and the receiver gain function, which, because of the property of the delta function, reduces to $\frac{1}{2}(1+\cos(\omega_{step}\tau))*Gate(\tau)$. This signal is then integrated by the read-out structure over the gate-width to convert the optical signal to an electrical signal.

Figure 6:
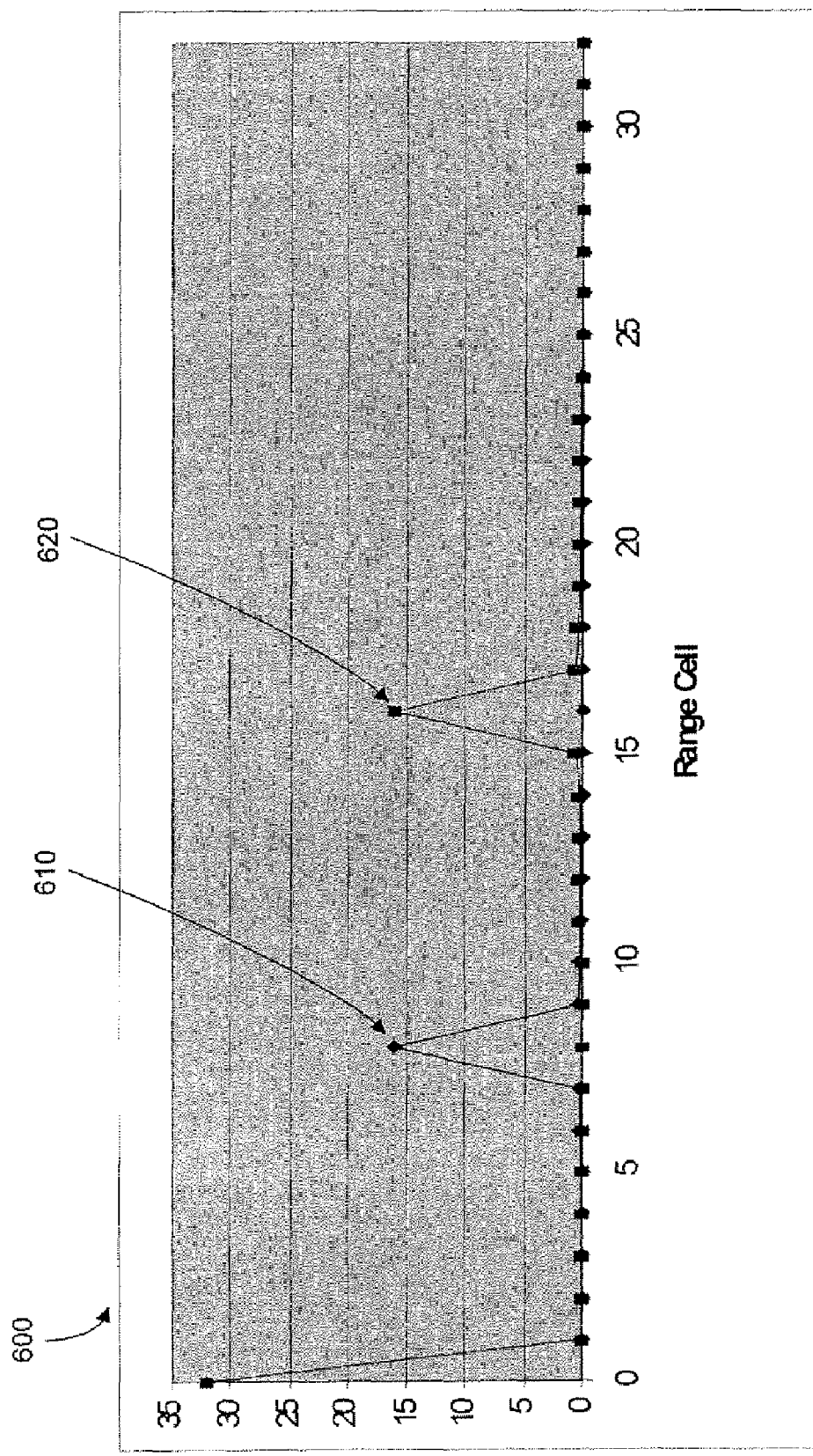

When the gating function $G(\tau)$ is 1, the signal measured by the receiver is proportional to the instantaneous gain modulation $\cos(\omega_{step}\tau)$ at the round trip delay time. FIG. 5 is a plot 500 of detected target signals 510, 520 for two individual targets at positions of 0.25 and 0.5 respectively. Target signals 510, 520 correspond to the gate width measured from the start of the gate for each frequency step using the parameters given in the example above. As with the original chirp AM ladar, each target signal oscillates at a frequency proportional to the target's range and, because the target signal is multiplied by the overall gating function; this range is limited to be inside of the range swath. As provided in FIG. 6, graph 600 provides a discrete Fourier transform of the target's signal, which maps the target frequency to target range inside of the gate, with the targets, 0.25 gate 610 and 0.5 gate 620, appearing in the $8^{th}$ and $16^{th}$ range cell.

If, instead of a single target illuminated in a pixel, there are two targets simultaneously illuminated in the same pixel, represented by a target function $\delta(t-\tau_1)+\delta(t-\tau_2)$, the signal detected by the receiver at each frequency step is $\frac{1}{2}(1+\cos(\omega_{step}\tau_1))*Gate(\tau_1)+\frac{1}{2}(1+\cos(\omega_{step}\tau_2))*Gate(\tau_2)$ When both targets are within the gate time so that both $Gate(\tau_1)$ and $Gate(\tau_2)$ are 1, the signal collected during the chirp will oscillate at the superposition of the two frequencies corresponding to each individual target's range, as plotted in FIG. 7. Although waveform 700 appears complicated when plotted as a function of time. After transforming the signal to range space by taking the DFT, discrete Fourier transform, both targets are easily separated and detected in the plot of the magnitude of the discrete Fourier transform for the 2-target signal depicted by waveform 800 shown in FIG. 8.

Processing embodiments of the present disclosure can be implemented in hardware, software, firmware, or a combination thereof. In the preferred embodiment(s), processing is implemented in software or firmware that is stored in a memory and that is executed by a suitable instruction execution system. If implemented in hardware, as in an alternative embodiment, the processing can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

The flow chart of FIG. 4 shows the architecture, functionality, and operation of a possible implementation of the processing software. In this regard, each block represents a module, segment, or portion of code, which comprises one or more executable instructions for implementing the specified logical function(s). It should also be noted that in some alternative implementations, the functions noted in the blocks may occur out of the order noted in FIG. 4. For example, two blocks shown in succession in FIG. 4 may in fact be executed substantially concurrently or the blocks may sometimes be executed in the reverse order, depending upon the functionality involved.

The processing program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present disclosure includes embodying the functionality of the preferred embodiments of the present disclosure in logic embodied in hardware or software-configured mediums.

It should be emphasized that the above-described embodiments of the present disclosure, particularly, any "preferred" embodiments, are merely possible examples of implementations, merely set forth for a clear understanding of the principles of the disclosure Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, at least the following is claimed:

1. A method comprising:
triggering a laser to emit an unmodulated short pulse laser beam;
modulating the gain of a receiver;
receiving, at the modulating receiver, a reflected laser beam signal associated with the laser beam emission; and
determining at least one characteristic associated with the reflected laser beam signal, further comprising
determining if the laser beam emission is complete after receiving the reflected laser beam signal; and, further comprising:
if the laser beam emission is not complete, triggering the laser again to emit an additional unmodulated short pulse laser beam;
detecting the additional unmodulated laser beam;
generating an additional receiver modulation waveform based on the detected additional laser beam emission;
receiving an additional reflected laser beam signal; and
determining at least one characteristic associated with the detected additional laser beam signal.

2. The method of claim 1, further comprising displaying a 4-D image associated with the at least one characteristic associated with the detected signal.

3. The method of claim 1, further comprising:
if the laser beam emission is complete then generating an image associated with the at least one characteristic associated with the reflected signal.

4. The method of claim 3, further comprising performing a transform to generate the image.

5. The method of claim 2, further comprising displaying a 4-D image associated with the at least one characteristic associated with the reflected signal.

* * * * *